Nov. 8, 1938.  D. S. FORESTER  2,136,291
SAW SET DEVICE
Filed May 25, 1937
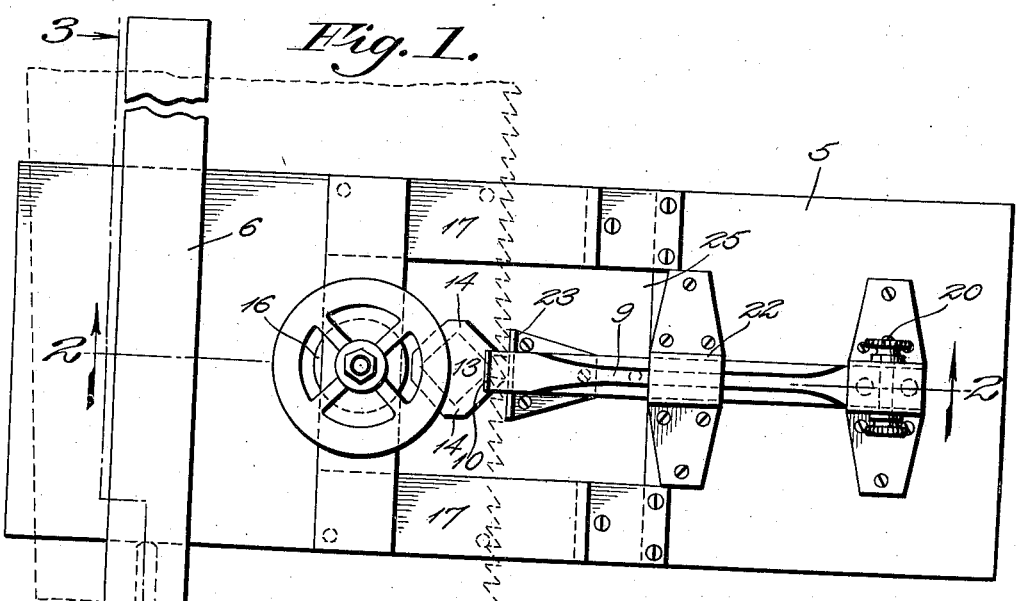
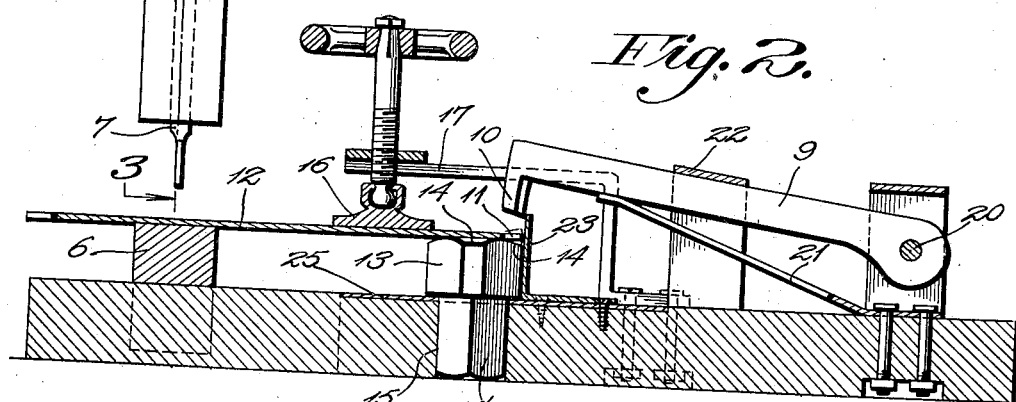
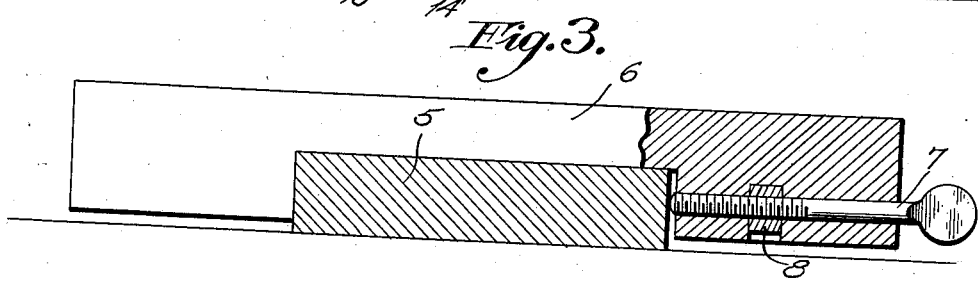
Daniel S. Forester
INVENTOR
BY Victor J. Evans & Co.
ATTORNEYS
WITNESS Patented Nov. 8, 1938

2,136,291

UNITED STATES PATENT OFFICE 2,136,291

SAW SET DEVICE

Daniel S. Forester, Pennington Gap, Va.

Application May 25, 1937, Serial No. 144,704

2 Claims. (Cl. 76—65)

My invention relates to improvement in saw tools and more particularly to that class known as saw-set devices.

One of the principal objects of my invention is to provide a saw-set device equipped with means for accommodating saws of various sizes, and securely holding them in a fixed position during the tooth-setting operation.

Another object of my invention is to provide a saw-set device which is economical as to manufacture, simple in construction, and easy to operate.

Other objects and advantages will be apparent from the following description, appended claims, and annexed drawing.

Referring to the drawing wherein like characters designate like parts throughout the several views:

Fig. 1 is a top plan view of my invention.

Fig. 2 is a longitudinal section taken on the line 2—2 of Fig. 1.

Fig. 3 is a cross sectional view taken on the line 3—3 of Fig. 1.

The preferred embodiment of the invention, as illustrated in the drawing, comprises a base 5 and is preferably constructed of hard wood although any other suitable material may be employed. At one end of the base 5 there is mounted an adjustable saw support member 6 having a set screw 7 mounted therein. A suitable nut 8 is also carried by the support member 6 and co-operates with the set screw 7 to securely hold the support member 9 to the base 5, as clearly illustrated in Fig. 3 of the drawing. Pivotally mounted at the opposite end of the base 5 is a die-bar 9 having a die 10 formed on one end thereof and adapted to substantially conform to the shape of the saw teeth 11 carried by the saw blade 12. Detachably mounted within the base 5 and disposed intermediate of the support 6 and die-bar 9 is an anvil 13 having a plurality of varying inclined upper faces 14, one of said faces to receive thereon a saw tooth. The anvil 13 is provided with a lower shank portion which is squared as at 14 to prevent rotation of the same while seated in the squared socket 15 provided in the base.

Means, embracing a screw operated clamp 16 mounted for rotation upon suporting brackets 17, serves to clamp the saw blade 12 upon the support and anvil.

The die-bar 9 is provided with a suitable removable pivot pin 20, whereby, upon the removal of said pin, the bar may be shifted to a position to enable the extraction of the anvil 10 for the purpose of reinserting the anvil in another position, thus locating another of the faces 14 under the die 10. A suitable spring 21, connected to the base, normally urges the die-bar upwardly. A guide member 22 limits the upward movement of the die-bar and prevents lateral movement thereof.

Juxtapositioned in relation to the anvil is a saw tooth guide 23 secured to the base, which is preferably constructed of soft metal or other like material. The guide 23 serves to properly aline the teeth of the saw in respect to the anvil 13 and die 10.

In use, the saw blade 12 is positioned upon the support 6 and anvil 13, the tooth 11 being alined against the guide 23 and the clamp operated downwardly against the saw blade 12 to securely hold the saw on the support 6 and anvil 9. In this position, a tooth is now located between one of the inclined surfaces 14 of the anvil and the die 10 and also properly alined therewith and is in readiness to receive the action of the die. Upon a blow being imparted the die-bar, the die descends, engages, and shapes the tooth to conform to the particular angle of the inclined surface 14. The clamp is then manipulated to permit the saw blade to be shifted a sufficient distance to bring another desired tooth into alinement with the die and anvil. Repeated operations of this character enable certain saw teeth to be set at a desired angle and by reversing the saw blade, others are set at a corresponding angle in relation to the opposite face of the saw blade.

While the upper inclined surface 14 of the anvil 13 has been illustrated as constituting four in number and with varying angles to enable the saw teeth to be set for such cutting purposes as light, medium, heavy, or extra heavy work, any desirable number or type may be formed thereon. It is to be noted, that while I have illustrated a so-called form of straight saw, that circular saws may also be operated upon without any change in the construction of the device.

In the instances where the base is constructed of hard wood, I provide a metal reinforcing strip 25 for reinforcing the same and to prevent splitting thereof.

It is to be distinctly understood that various changes and modifications may be resorted to without departing from the spirit of the invention or scope of the appended claims.

Having described my invention, what I claim is:

1. A saw-set device comprising a base, a saw support secured to said base, a bracket mounted on said base and having spaced connected arms extending towards said support, an anvil provided with a plurality of tooth faces of different inclinations and detachably mounted on said base between said bracket and said support, a die-bar detachably hinged to said base and extending over said anvil and between said arms, said die-bar fashioned with a die formed on one end thereof and normally disposed above one of the faces of said anvil for coaction therewith to set a saw tooth, a clamp adjustably mounted on said connected arms for clamping a saw to said anvil on the top thereof and in a manner to maintain a saw tooth over an inclined face of said anvil against relative movement therewith, a spring connected to said base and said die-bar for normally maintaining said die in raised position over said anvil, and a member carrier by said base for limiting the movement of said die-bar away from said anvil to preclude accidental dislodgement of said anvil from an adjusted position on said base, said die-bar readily detachable from said base whereby to permit said anvil to be adjusted for aligning any one of said faces with said die for setting a saw tooth in conformity with a selected face.

2. A saw-set device comprising a base, a saw support secured to said base, a bracket mounted on said base and having spaced connected arms extending towards said support, an anvil provided with a plurality of tooth faces of different inclinations and detachably mounted on said base between said bracket and said support, a die-bar detachably hinged to said base and extending over said anvil and between said arms, said die-bar fashioned with a die formed on one end thereof and normally disposed above one of the faces of said anvil for coaction therewith to set a saw tooth, a clamp adjustably mounted on said connected arms for clamping a saw to said anvil on the top thereof and in a manner to maintain a saw tooth over an inclined face of said anvil against relative movement therewith, a spring connected to said base and said die-bar for normally maintaining said die in raised position over said anvil, a member carried by said base for limiting the movement of said die-bar away from said anvil to preclude accidental dislodgement of said anvil from an adjusted position on said base, said die-bar readily detachable from said base whereby to permit said anvil to be adjusted for aligning any one of said faces with said die for setting a saw tooth in conformity with a selected face, and a guide member secured to said base adjacent said anvil and having a section for positioning a saw tooth over a face of said anvil for operation thereon by said die.

DANIEL S. FORESTER.